United States Patent [19]
Jonsson et al.

[11] Patent Number: 5,574,317
[45] Date of Patent: Nov. 12, 1996

[54] DEVICE FOR COMPENSATION OF AN ALTERNATING VOLTAGE WHICH OCCURS BETWEEN A MEDIUM AND A METALLIC PIPELINE DISPOSED IN THE MEDIUM

[75] Inventors: Uno Jonsson, Vällingby; Dan Karlsson, Ludvika, both of Sweden

[73] Assignee: STRI AB, Sweden

[21] Appl. No.: 392,887

[22] PCT Filed: Aug. 29, 1994

[86] PCT No.: PCT/SE94/00793

§ 371 Date: Mar. 1, 1995

§ 102(e) Date: Mar. 1, 1995

[87] PCT Pub. No.: WO95/06761

PCT Pub. Date: Mar. 9, 1995

[30] Foreign Application Priority Data

Sep. 2, 1993 [SE] Sweden .................. 9302831

[51] Int. Cl.⁶ .................................. H01B 7/28
[52] U.S. Cl. .............................. 307/95; 204/196
[58] Field of Search .................. 307/95, 89–91, 307/101, 104; 405/157; 204/404, 196; 174/32, 33, 34, 36; 333/12; 324/72

[56] References Cited

U.S. PATENT DOCUMENTS 5,126,654  6/1992  Murphy et al. .................. 204/196
5,325,047  6/1994  Kempton .......................... 324/72

FOREIGN PATENT DOCUMENTS 0285747    1/1988   European Pat. Off. .
0529372A1  8/1992   European Pat. Off. .
466160    12/1990   Sweden .
469987     5/1992   Sweden .
9207109    4/1992   WIPO .................. 204/196

Primary Examiner—William M. Shoop, Jr.
Assistant Examiner—Richard T. Elms
Attorney, Agent, or Firm—Watson, Cole, Stevens, Davis. PLLC

[57] ABSTRACT

In a metallic pipeline (1) disposed in the ground, alternating voltages may be induced from adjacent transmission lines and cause corrosion. To reduce the risk of corrosion, an alternating current ($i_1$) is caused by means of a compensating device (PD) to flow through the line and to cause a voltage drop which counteracts the induced voltages. A measuring conductor (2) provides a signal ($u_x$) which is a measure of the induced voltage. This signal controls the amplitude and phase position of an alternating voltage ($u_1$) which is generated by an a.c. source which is connected to feed points (A, B) on the line and which causes an alternating current ($i_1$)) to flow through the line. (FIG. 1a)

8 Claims, 6 Drawing Sheets

5,574,317

DEVICE FOR COMPENSATION OF AN ALTERNATING VOLTAGE WHICH OCCURS BETWEEN A MEDIUM AND A METALLIC PIPELINE DISPOSED IN THE MEDIUM

TECHNICAL FIELD

The invention relates to a device for compensation of an alternating voltage which occurs between a medium and a metallic pipeline disposed in the medium, the pipeline being surrounded by a layer (mantle) of electrically insulating material.

BACKGROUND ART

In case of parallelism between a.c. transmission lines and metal pipes for, for example, natural gas, the normal operating current of the transmission line induces a voltage in the metal pipe. For example, from a 400 kV line with an operating current of 1000 A at a distance of 50 m from the pipeline, an induced voltage of about 20 V/km can be obtained.

A metal pipe of the above kind may, for example, constitute part of a long gas conduit, which is disposed in the ground and possibly partially also in water. A conduit of this kind is usually divided into sections with the aid of electrically insulating joints. The length of one section may vary from several kilometers up to several tens of kilometers. If a transmission line runs parallel to such a line for a distance of some length, induced voltages of a considerable magnitude may therefore occur.

When the alternating voltage between the pipe and the surrounding ground (water) exceeds a few tens of volts, this may entail an increased risk of corrosion damage to the pipeline because of electrolytic corrosion. Metal pipes of the kind in question are provided with a protective coating of an electrically insulating material. However, damage unavoidably arises in this coating, whereby the metal pipe is brought into electrical contact with the surrounding medium. At these points the above-mentioned risk of corrosion occurs.

Different types of measures for protection against corrosion are previously known. However, these do not provide any protection against the risk of corrosion which is caused by alternating voltages induced in a pipeline.

A previously know device for corrosion protection of a pipeline disposed in the ground or in water is disclosed in Swedish published patent application 466 160. This device aims at protecting the pipeline against corrosion caused by potential differences in the medium surrounding the pipeline (ground potential differences). The device primarily relates to those cases where the ground potential differences are caused by electric currents flowing in the medium, which typically originate from electric d.c. power plants. The difference in ground potential between two points on the pipeline is sensed by means of ground electrodes disposed near the line. A d.c. source is connected to two points on the line and is adapted to feed a current through the line between these points. The current is controlled in such a way in dependence on the sensed ground potential difference that the voltage drop caused by the current along the pipe corresponds to the ground potential difference.

It is also stated that the device can be designed so as to protect against corrosion in those cases where the ground currents consist of alternating currents. The ground potential difference then consists of an alternating voltage, and instead of a d.c. source an a.c. source is arranged to drive a suitable alternating current through the pipeline.

This known device provides corrosion protection for those cases where the risk of corrosion originates from ground potential differences. However, the device provides no protection at all against the risk of corrosion which is caused by voltages induced in the pipeline.

SUMMARY OF THE INVENTION

The invention aims to provide a device which, in a simple and advantageous manner, provides good protection against the risks of corrosion which, in pipelines of the kind mentioned in the introduction, are caused by alternating voltages induced in the pipelines.

What characterizes a device according to the invention will become clear from the appended claims.

BRIEF DESCRIPTION OF THE DRAWINGS

The invention will be described in greater detail with reference to the accompanying FIGS. 1a, 1b, 2a, 2b, 3, 4, 5a and 5b, wherein.

DESCRIPTION OF THE PREFERRED EMBODIMENTS

Figure 1A:
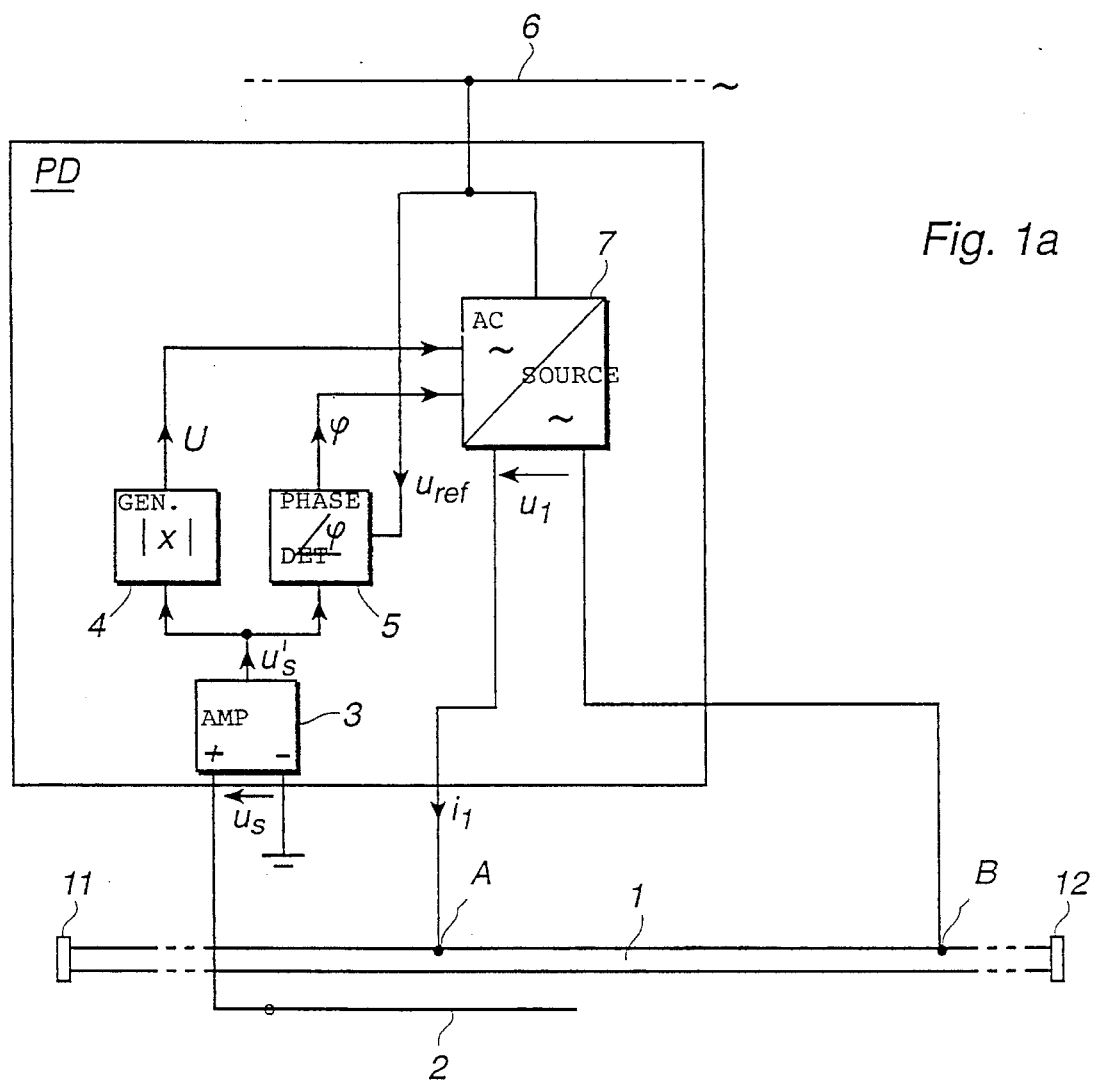
FIG. 1a shows an example of a device according to the invention.

FIG. 1a shows an elementary diagram of a piece of equipment PD according to the invention. The figure shows a section 1 of a metallic natural gas conduit 1 disposed in the ground, the conduit being provided with an electrically insulating coating and being electrically insulated from adjoining pipe sections with the aid of electrically insulating joints 11 and 12. To provide a measure of the alternating voltage which can be induced in the section 1 by electric transmission lines, which extend in the vicinity of and wholly or partially parallel to the pipe section, a measuring conductor 2 insulated from ground is arranged. This conductor may be arranged in the ground, on the ground or above the ground. The measuring conductor 2 is suitably arranged parallel to the pipeline and close to this. The length of the measuring conductor may be small in relation to the length of the section 1, but if desirable for obtaining a sufficient magnitude of the measured signal from the conductor, or for making the measured signal sufficiently representative for the voltage induced in the line section, the length of the conductor may constitute a considerable part of the length of the section. The measuring conductor may be arranged along all of or part of the supply section A-B of the pipeline, or, as shown in the figure, it may be displaced in relation thereto. The conductor 2 is insulated from ground but may possibly be grounded at a suitable point. The voltage $u_s$ induced in the conductor 2 is supplied to an instrument amplifier 3, the output signal of which is designated $u'_s$. Due to the location of the measuring conductor 2 parallel to and close to the pipe section 1, the signals $u_s$ and $u'_s$ become a good measure of the voltage in the pipe section induced by the operating current of the transmission line. The signal $u'_s$ from the instrument amplifier 3 is supplied to an absolute value generator 4 and a phase detector 5. The absolute value generator 4 delivers a signal U which is proportional to the amplitude of the voltage $u_s$ induced in the measuring conductor 2. The phase detector 5 delivers a signal φ which is proportional to the phase difference between the signal $u'_s$ and a reference voltage $u_{ref}$. The reference signal is an alternating signal with the same frequency as the frequency in the transmission line which causes the voltages induced in the pipeline. As shown in the figure, the reference voltage can be obtained in the simplest manner from a local network 6, which belongs to the same power network as the above-mentioned transmission line and therefore has the same frequency as this.

The signals U and φ are supplied to an a.c. source 7, which is connected to two feed points A and B in the pipeline. That part of the pipeline, the supply section, which is located between points A and B is supplied from the a.c. source (which has the output voltage $u_1$) with an alternating current $i_1$, which in the supply section generates a voltage drop $du_{AB}$. The amplitude of the voltage drop becomes proportional to the amplitude of the current $i_1$, and the proportionality constant consists of the absolute value of the impedance of the supply section. The impedance of a typical pipeline is about 0.3 ohm/km, and this impedance is practically purely inductive—the resistance is negligible compared with the inductance.

As shown in FIG. 1a, the a.c. source 7 may consist of an alternating voltage converter, for example an intermediate link converter with a controllable rectifier supplied from the network 6, a direct voltage intermediate link, and a self-commutated inverter adapted to deliver an alternating voltage with a controllable frequency and hence with a controllable phase position. In this embodiment of the controller 7, the voltage U is adapted to control the intermediate link direct voltage and hence the amplitude of the voltage $u_1$ delivered by the converter, and the signal φ is adapted to control the inverter such that the voltage $u_1$ is given the desired phase position in relation to the reference voltage. Since the impedance of the supply section is nearly purely inductive, the voltage drop $du_{AB}$ across the supply section has a phase lead of almost 90 degrees in relation to the current $i_1$. The amplitude and phase position of the voltage $u_1$ are controlled such that this voltage drop is substantially in opposition to the voltage induced in the line section and is given a suitable magnitude in relation to the induced voltage. In this connection, the impedances of the lines between the current source 7 and the connection points A and B must be taken in account. Since both these impedances and the impedance of the supply section may be assumed to be nearly constant, this fact can be taken into account in a simple manner when controlling the current source 7. Thus, the current source can suitably be controlled such that the amplitude of the voltage $u_1$ becomes a first constant times the sensed voltage amplitude $u_s$, and such that the phase position of the voltage $u_1$ becomes the sensed phase position plus a second constant.

With a correct choice of the two constants mentioned above, as is clear from the above-mentioned voltage drop, $du_{AB}$ will lie in opposition to the EMF induced in the pipeline by the transmission line. These two EMFs will thus counteract each other, and with a correct design and adjustment of the equipment according to the invention, a good compensation may be obtained of the voltages induced in the pipeline 1 by the transmission line current, that is, a considerable reduction of the maximum voltage between the pipeline and ground, and hence a considerable reduction or a complete elimination of the risk of corrosion. The two constants mentioned above are chosen and adjusted into the control system such that the desired degree of suppression is obtained of the voltage induced in the pipeline. The constants can be determined by calculation, measurement or by practical tests.

If considered necessary, the signal from the measuring conductor 2 can be filtered in a band-pass filter tuned to the frequency of the transmission line, the reason being to eliminate the effect of voltages occurring in the measuring conductor and originating from sources other than the transmission line.

Figure 1B:
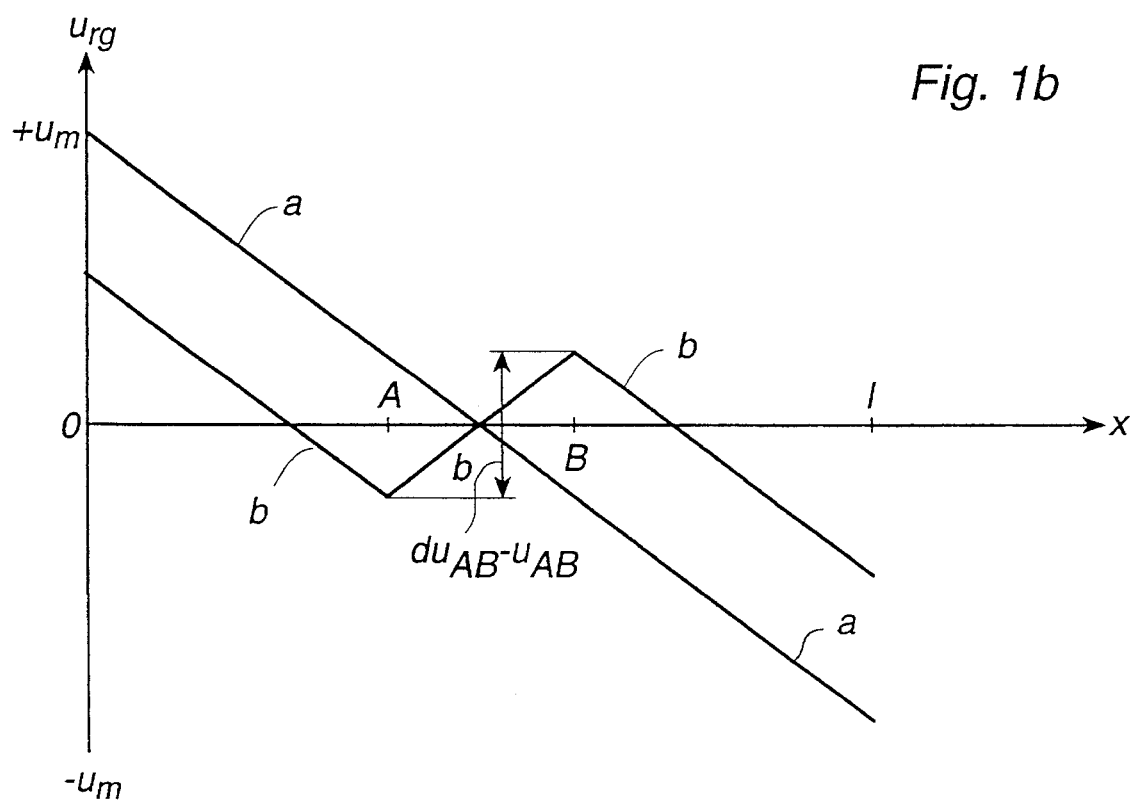
FIG. 1b shows the reduction of the voltage between the pipeline and the surrounding medium which is obtained with the aid of the device according to the invention shown in FIG. 1a, FIG. 2a shows how, according to the invention, several compensating devices and supply sections can be arranged along a section of the pipeline.

FIG. 1b shows the voltage $u_{rg}$ in the pipeline in relation to ground plotted against the distance x from one end of the line section. The section is assumed to have the length 1 and be grounded at its centre, for example through damage to the electrical insulation of the line. The curve designated a in the figure shows the voltage between the pipeline and ground which would be caused by a transmission line extending in parallel with the line section along the whole of its length. The voltage assumes a maximum value $\pm u_m$ at the end points of the section. If a supply section A-B according to the invention is arranged at the central part of the line section and adapted to generate in the pipeline a voltage drop $du_{AB}$, the voltage will have an appearance as shown by the curve b, where $u_{AB}$ is the voltage induced in the pipeline between points A and B. As will be clear from the figure, a considerable reduction of the maximum voltage between the pipeline and ground is obtained according to the invention.

In the example shown in FIG. 1b, the current $i_1$ to the supply section A-B, and hence the voltage drop $du_{AB}$ across the supply section, are so chosen in dependence on the induced voltage that the maximum voltage between the pipeline and ground (which occurs at points A and B and at the ends of the section) becomes as low as possible. In dependence on the individual circumstances, of course, the voltage drop across the supply section can be set in a different way.

Figure 2A:
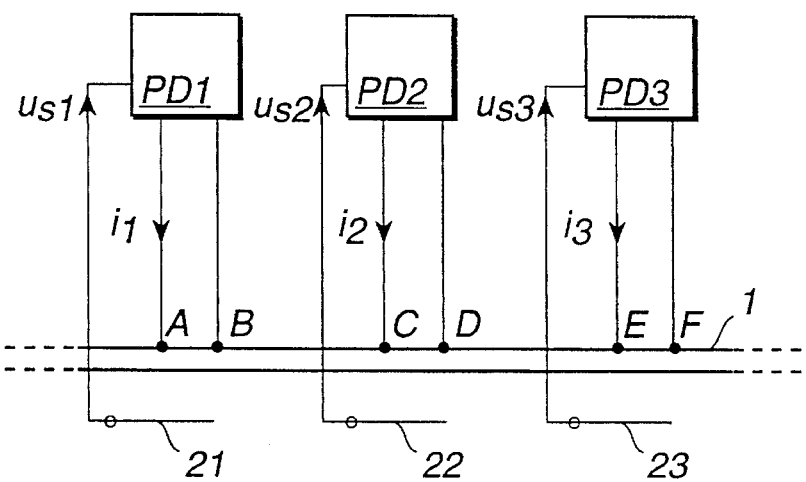
FIG. 2b illustrates function of the equipment shown in FIG. 2a, FIG. 3 shows an alternative embodiment in which the current to a supply section is obtained with the aid of a power amplifier.
Figure 2B:
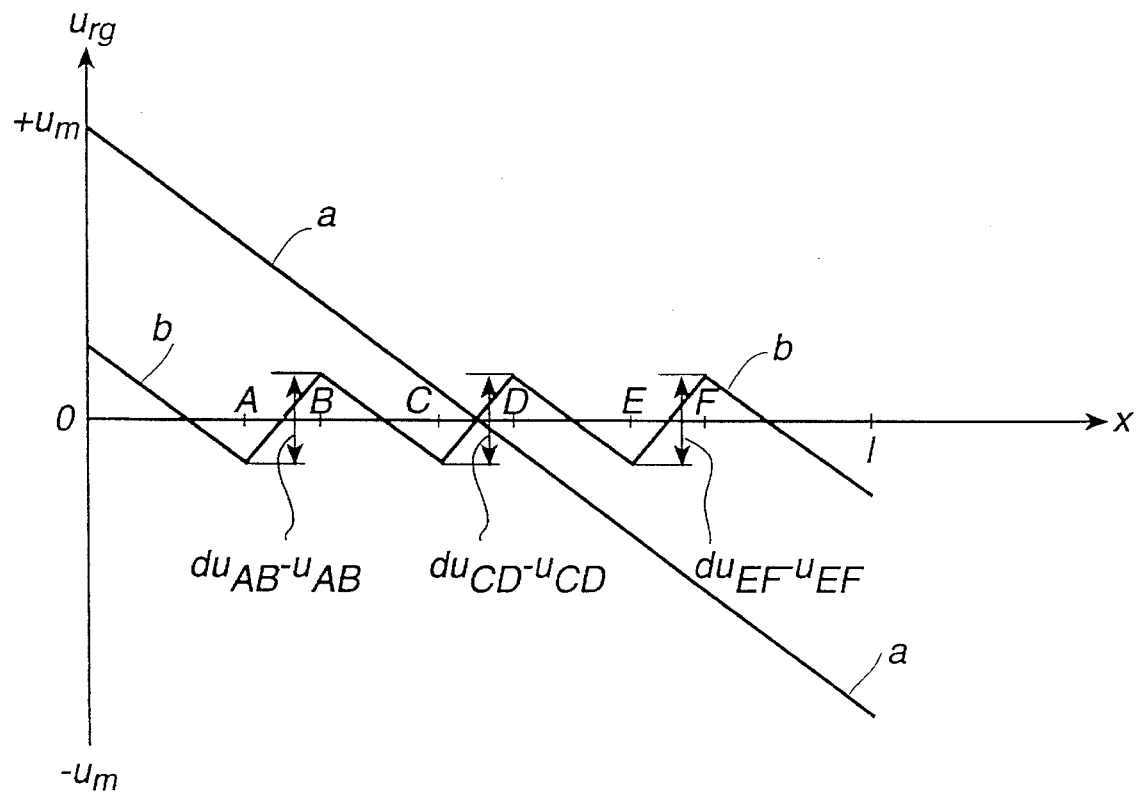

A further reduction of the maximum voltage between the pipeline and ground can be obtained according to an embodiment of the invention in which several supply sections with associated current sources are arranged along a line section. FIG. 2a shows part of such a line section. A first compensating device PD1 is connected to the connection points A and B. It has a measuring conductor 21 and delivers, in dependence on the voltage induced in the measuring conductor, a current $i_1$ to the supply section. In a corresponding way, a second compensating device PD2 is connected to the connection points C and D and has a measuring conductor 22, the induced voltage of which controls the current $i_2$ of the device. Further, a third compensating device PD3 is connected to the feed points E and F and has a measuring conductor 23, the voltage of which controls the current $i_3$ of the device. In FIG. 2b, the curve b shows the voltage which is obtained between the pipeline and ground. As is shown, a more complete reduction of the maximum voltage between the line and ground can be obtained in this way. In FIG. 2b, for the sake of simplicity the voltage drops $du_{AB}$, $du_{CD}$, $du_{EF}$ generated by the three compensating devices are shown equally great. In practice, however, the signals of the measuring conductor will differ from each other—and hence also the voltage drops across the three supply sections—and this in such a way as to obtain the best possible compensation of the induced voltage.

Possibly, the three compensating devices in FIG. 2a may be controlled from one single common measuring conductor. Possibly, also the control equipment (units 3, 4, 5 in FIG. 1a) may then be common to the three devices which then only have separate output stages (corresponding to unit 7 in FIG. 1a). Possibly, the output stage may also be common, in which case, however, this must be connected to the supply sections via transformers to obtain the necessary galvanic separation.

Also in the case shown in FIGS. 1a and 2a with one separate compensating device per supply section, it may be advantageous to connect the compensating device to the supply section via a transformer in order to adapt the a.c. source, with respect to current and voltage levels, to its load—the supply section.

Figure 3:
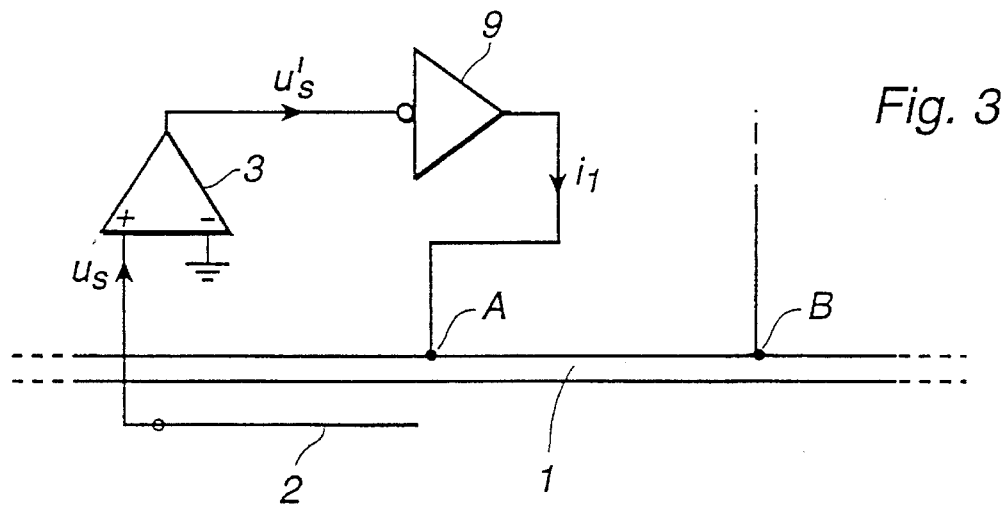

FIG. 3 shows an alternative embodiment of the equipment according to the invention. The signal $u'_s$ from the instrument amplifier 3 is supplied to a power amplifier 9 which supplies to the supply section A-B a current $i_1$ proportional to the measured signal. By a suitable design of the circuit, the voltage drop across the supply section will be in opposition to the voltage induced in the line section, and by a suitable adjustment of the amplification factor of the amplifier, in principle a complete suppression of the voltages induced in the pipeline 1 can be obtained, independently of their frequencies. The amplifier 9 may, for example, be a switched power amplifier of a kind known per se.

Figure 4:
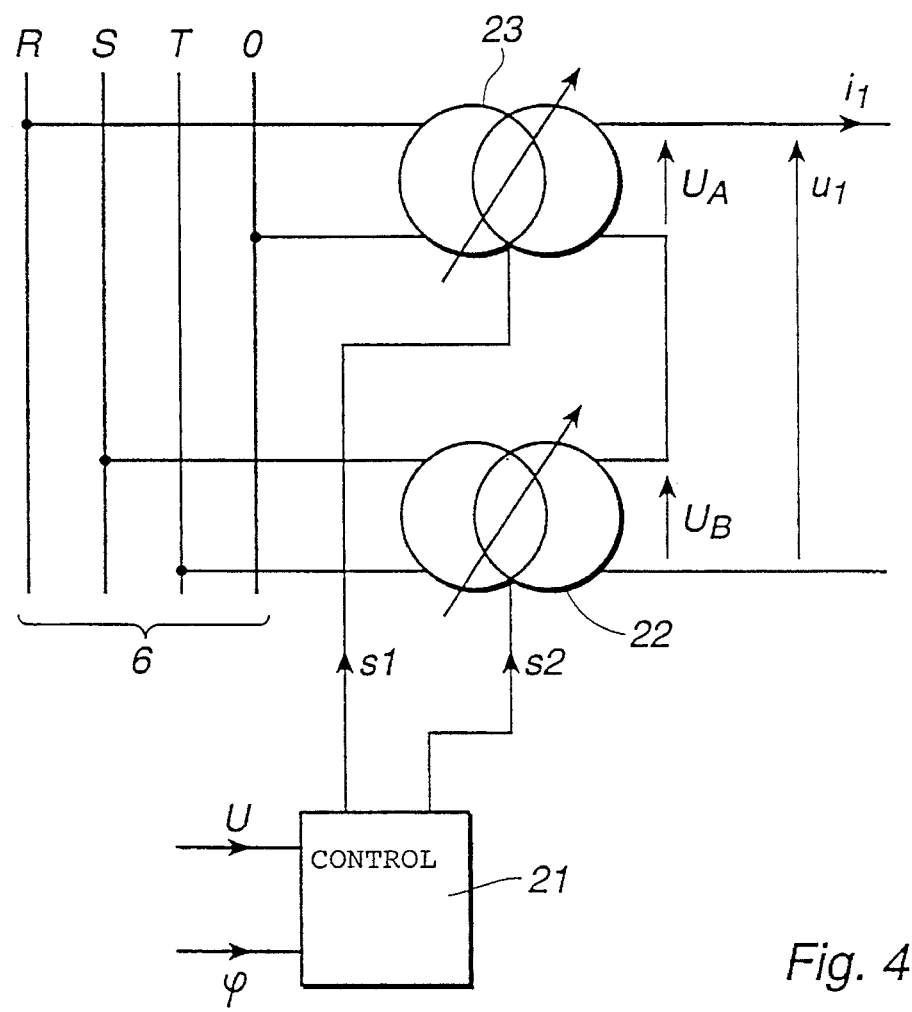
FIG. 4 shows how a controllable transformer connection can be used as an alternative for generating the current to a supply section.
Figure 4:
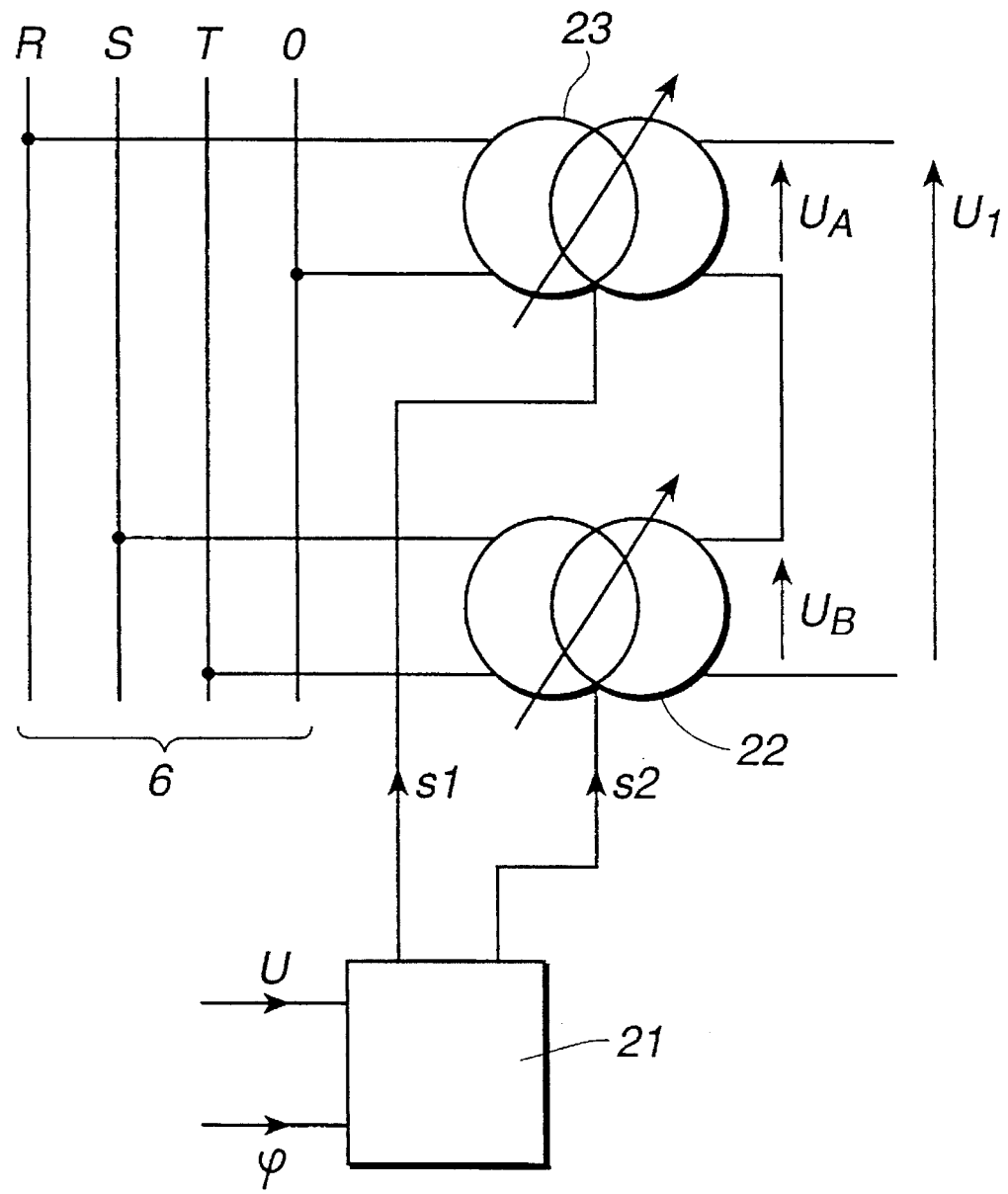

FIG. 4 shows how, as an alternative, a transformer connection can be used for generating the supply voltage to a supply section. The connection comprises two single-phase transformers 22 and 23. The transformer 22 has its primary winding connected to the phases S and T of the local network 6, and the transformer 23 has its primary winding connected between the phase R and the neutral line 0 of the network. The amplitude of the output voltage of each transformer is controllable, continuously or in steps. The transformers may, for example, consist of servo-motor operated adjustable transformers or of transformers which are provided with tap changers. In the connection shown, the output voltage $U_A$ from the transformer 23 will have a phase shift of 90° in relation to the output voltage $U_B$ from the transformer 22.

Since the secondary windings of the two transformers are connected in series, their output voltages will be added vectorially, and their vector sum constitutes the supply voltage $u_1$ to the supply section. If the output voltage of each transformer can be varied from maximum amplitude in one phase position to maximum amplitude in the opposite phase position, the output voltage $u_1$ may in a known manner be controlled arbitrarily both with respect to amplitude and phase position within all four quadrants. For control of the transformers, the signals U and $\phi$ (see FIG. 1a) are supplied to a control unit 21, which delivers control signals s1 and s2 to the actuators of the transformers. The control device may, for example, deliver such control signals s1 and s2 to the transformers that the output voltages thereof become:

$$U_A = k_1 \cdot U \cdot \sin(\phi + k_2)$$

$$U_B = k_1 \cdot U \cdot \sin(\phi + k_2)$$

By a suitable choice of the constants $k_1$ and $k_2$, the supply voltage $u_1$ to the supply section of the pipeline section can be given such an amplitude and such a phase position that the voltage drop in the supply section compensates for the induced voltage.

Figure 5A:
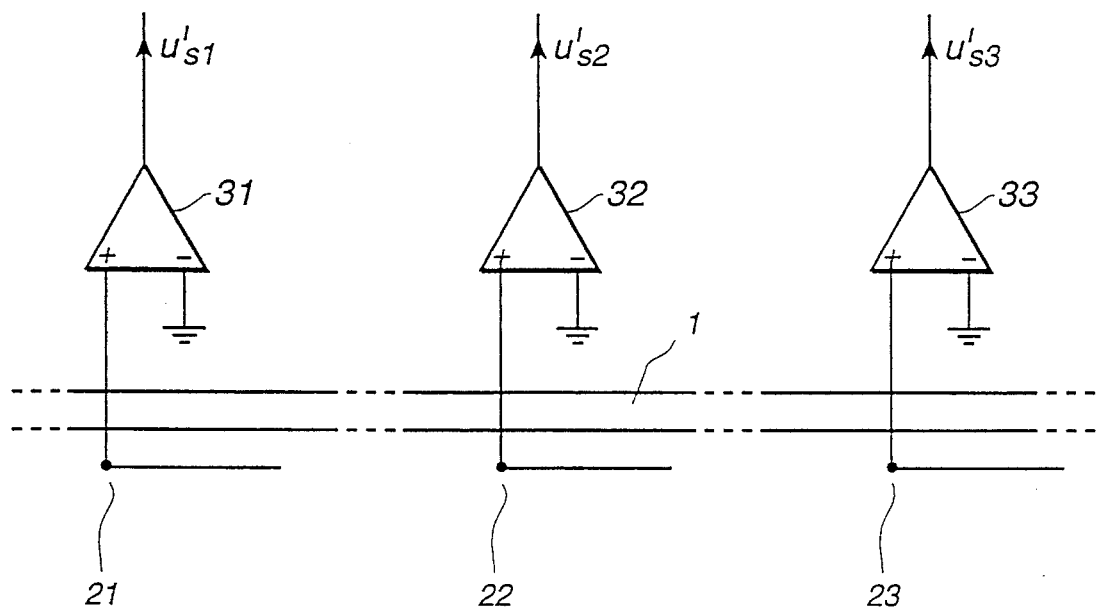
FIGS. 5a and 5b show an alternative method for controlling the current to the supply section of the pipeline.
Figure 5B:
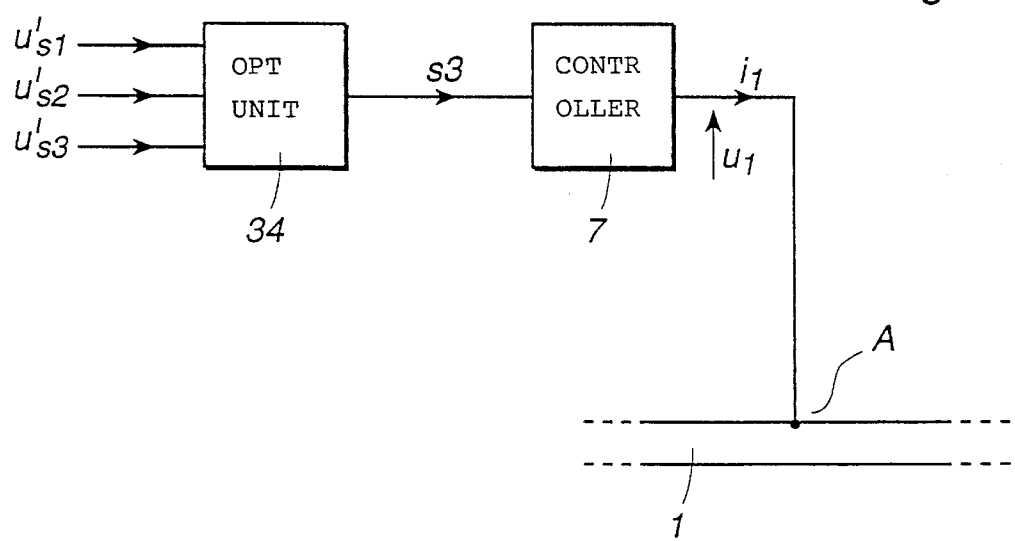

The control of the equipment according to the invention can be carried out in other ways than the one described above. For example, as shown in FIG. 5a, the induced voltage may be sensed at a plurality of locations distributed along the pipeline. In the example of FIG. 5a, this is done by means of a plurality of measuring conductors 21, 22, 23, the induced voltages of which are supplied to instrument amplifiers 31, 32, 33. The output signals $u'_{s1}$, $u'_{s2}$, $u'_{s3}$ of the instrument amplifiers are supplied to an optimization unit 34 (FIG. 5b). This, in turn, delivers a control signal s3 to the controller 7. The control signal s3 influences the amplitude and phase position of the voltage $u_1$ generated by the controller and hence of the current $i_1$ which is supplied to the supply section. The optimization unit 34 may, for example, consist of a suitably programmed computer adapted to influence the current $i_1$ via the control signal s3 in such a way in dependence on the measured signals that the risk of corrosion of the pipeline is minimized.

The measuring conductors 2 described above constitute one way of forming a measure of the voltage induced in the pipeline. Also other ways are feasible. The voltage induced in the pipeline is, of course, in magnitude and in phase position, directly dependent on the load current of the power transmission. In those cases where it is possible and suitable to measure this current, it can be used directly as a measure of the voltage induced in the pipeline.

In the above description, it has been implicitly assumed that the load current in the transmission line, and hence the voltage induced in the pipeline, is a pure sine wave without harmonics. In practice, harmonics may occur in the load current and induce alternating voltages of corresponding frequencies in the pipeline, which voltages, in the same way as the fundamental component, may cause risks of corrosion. The embodiment of the invention shown in FIG. 3 will automatically entail a compensation also of induced harmonics, since the current $i_1$ applied to the supply section constitutes a sign-reversed reproduction of the measured signal $u_s$ obtained from the measuring conductor 2. Harmonics in the induced voltage may, of course, be compensated for also in other ways. Thus, for example, both the fundamental component and the harmonics in question may be separated out of the measured signal with the aid of band-pass filters and be determined individually in amplitude and phase position, whereupon the desired voltage $u_1$ and/or current $i_1$ for suppressing all the sensed components are synthetized in a suitable way with the aid of suitable electronic circuits.

As an alternative to the converter connection 7 shown in FIG. 1 and to the transformer connection shown in FIG. 4, a cascade connection of an induction regulator and an adjustable transformer can be used, the induction regulator being used for controlling the phase position of the supply voltage to the supply section and the adjustable transformer being used for controlling the amplitude of the voltage.

In the embodiments of the invention described above, the output voltage ($u_s$) of the measuring conductor controls the voltage ($u_1$) of the a.c. source with the aid of a non-feedback control system. Alternatively, a feedback control system may be used, in which case, for example, the current ($i_1$) delivered by the a.c. source is sensed and compared in amplitude and phase position with the measured signal or with a reference quantity formed from the measured signal.

We claim:

1. A device for compensation of an alternating voltage induced in a metallic, electrically insulated pipeline and directed in the longitudinal direction of the pipeline, said pipeline is disposed in a medium, wherein the device comprises:

(a) first members forming a first quantity which corresponds to an alternating voltage induced in the longitudinal direction of the pipeline, and (b) a controllable a.c. source connected to connection points on the pipeline, said connection points spaced from each other in the longitudinal direction of the pipeline, said a.c. source supplying said first quantity and, in dependence thereon, to cause an alternating current to flow in the longitudinal direction of the pipeline with such an amplitude and such a phase position that the voltage drop in the longitudinal direction of the pipeline tends to reduce the voltage difference between the pipeline and the medium.

2. A device according to claim 1, wherein the first members comprise a measuring conductor disposed in the medium adjacent the pipeline and insulated from the medium, and the first quantity is formed from an alternating voltage induced in the measuring conductor.

3. A device according to claim 1, wherein the first members comprise amplitude-sensing members forming an amplitude signal corresponding to the amplitude of the induced voltage, and phase-angle sensing members forming a phase position signal corresponding to the phase position of the induced voltage, which signals are supplied to the a.c. source, which in turn is supplied to the pipeline as a current with an amplitude corresponding to the amplitude signal and a phase position corresponding to the phase position signal.

4. A device according to claim 3, wherein the phase-angle sensing members form the phase position signal in dependence on the phase position of the in induced voltage in relation to a reference alternating voltage, and the a.c. source generates an alternating current with the same frequency as the reference alternating voltage and with a phase position, in relation to the reference alternating voltage, dependent on the phase position signal.

5. A device according to claim 1, wherein the pipeline has a plurality of pairs of connection points and an a.c. source connects each pair of connection points.

6. A device according to claim 1, wherein the a.c. source consists of a converter connection.

7. A device according to claim 1, wherein the a.c. source consists of a power amplifier.

8. A device according to claim 1, wherein the a.c. source consists of a controllable transformer connection.

* * * * *

UNITED STATES PATENT AND TRADEMARK OFFICE
CERTIFICATE OF CORRECTION

PATENT NO. : 5,574,317
DATED : November 12, 1996
INVENTOR(S) : Uno JONSSON ET AL.

It is certified that error appears in the above-identified patent and that said Letters Patent is hereby corrected as shown below:

Column 7,
Claim 1, line 13 should read: --pipeline, said a.c. source being supplied with said first quantity--

Signed and Sealed this

Twenty-fifth Day of February, 1997

Attest:

BRUCE LEHMAN

*Attesting Officer*  *Commissioner of Patents and Trademarks*